United States Patent
Kim et al.

(10) Patent No.: US 11,976,151 B2
(45) Date of Patent: May 7, 2024

(54) POLYMER POLYOL AND PROCESS FOR PRODUCING THE SAME

(71) Applicant: KOREA KUMHO PETROCHEMICAL CO., LTD., Seoul (KR)

(72) Inventors: Seulgi Kim, Daejeon (KR); Gi Jung Kim, Pyeongtaek-si (KR); Jinwoo Park, Daejeon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 0 days.

(21) Appl. No.: 18/049,780

(22) Filed: Oct. 26, 2022

(65) Prior Publication Data

US 2023/0399449 A1    Dec. 14, 2023

(30) Foreign Application Priority Data

Jun. 14, 2022 (KR) ........................ 10-2022-0072208

(51) Int. Cl.
*C08F 283/06* (2006.01)

(52) U.S. Cl.
CPC ................................. *C08F 283/06* (2013.01)

(58) Field of Classification Search
CPC .................................................... C08F 283/06
See application file for complete search history.

(56) References Cited

U.S. PATENT DOCUMENTS

| | | | | |
|---|---|---|---|---|
| 5,223,570 A * | 6/1993 | Huang | ................. | C08G 18/636 525/445 |
| 5,364,906 A * | 11/1994 | Critchfield | ............ | C08F 291/08 528/392 |
| 5,814,699 A * | 9/1998 | Kratz | .................. | C08G 18/635 525/404 |
| 6,455,603 B1 * | 9/2002 | Fogg | .................... | C08G 18/636 521/137 |
| 10,294,336 B2 * | 5/2019 | Koenig | ................. | C09J 175/04 |
| 2006/0025492 A1 * | 2/2006 | Chauk | ................... | C08G 18/68 521/155 |
| 2017/0044297 A1 * | 2/2017 | Koenig | ...................... | C08J 9/00 |
| 2019/0270836 A1 * | 9/2019 | Kim | ..................... | C08G 18/0871 |
| 2019/0270853 A1 * | 9/2019 | Kim | ...................... | C08F 283/06 |

* cited by examiner

*Primary Examiner* — Mark S Kaucher
(74) *Attorney, Agent, or Firm* — Sughrue Mion, PLLC

(57) ABSTRACT

Disclosed is a process for producing a polymer polyol, comprising: (a) reacting a first mixture comprising an initiator, a polyol, a diluent, a stabilizer, a styrene-based monomer and a nitrile-based monomer; and (b) continuously adding, to the first mixture, a second mixture comprising an initiator, a polyol, a stabilizer, a styrene-based monomer and a nitrile-based monomer to react, wherein the first mixture and second mixture comprise the stabilizer in a weight ratio of 1:1 to 3, respectively, and a polymer polyol produced according to the process.

8 Claims, No Drawings

POLYMER POLYOL AND PROCESS FOR PRODUCING THE SAME

TECHNICAL FIELD

The present invention relates to a polymer polyol with excellent solvent resistance and a process for producing the same.

BACKGROUND ART

A polymer polyol (POP), which is used to enhance the hardness of polyurethane foam, is a product in which polymer particles in the solid phase are dispersed in base polyols in the liquid phase. In general, a styrene-acrylonitrile (SAN) copolymer is used as solid particles dispersed in polymer polyols, and serves as a support in the urethane cell structure when preparing polyurethane foams, thereby increasing the hardness of the foams while maintaining the flexibility thereof.

Conventional processes for producing polymer polyols use a polymerization method of mixing polymerizable monomers with a predetermined amount of base polyols, and continuously adding the mixture at a constant rate to a reactor in which the remaining base polyols are filled, while maintaining the polymerization temperature. Polymer polyols produced according to such processes have excellent miscibility with compatible organic solvents used for producing polyurethane, but have high viscosity.

In order to solve the problem of high viscosity, a polymerization process of feeding a stabilizer at once at the time of initial particle formation was suggested. When this polymerization process is used, SAN particles grafted with a large amount of polymerization stabilizer macromer produced in the initial polymerization and SAN particles grafted with a small amount of polymerization stabilizer produced in the late polymerization are produced, which causes difference in the grafting ratio between the particles. Such polymerization processes are suitable for production of polymer polyols having low viscosity. However, when mixing with compatible organic solvents such as methylene chloride, SAN particles in polymer polyols tend to be dissolved in methylene chloride and also tend to be dispersed in polyols at the same time, and thus the sludge is generated from aggregation around the SAN particles grafted with a large amount of the stabilizer.

Thus, a process was suggested to feed a stabilizer simultaneously with monomers, without adding the stabilizer to base polyols at the initial stage of production of polymer polyols, thereby making the grafting ratio of the SAN particle and the stabilizer the same. However, the viscosity of the polymer polyols eventually increased, and the quality of polyurethane foam products using the same decreased.

Accordingly, there is a demand for a technique of producing polymer polyols having excellent solvent resistance to organic solvents, causing little generation of sludge, and also having low viscosity.

DETAILED DESCRIPTION OF INVENTION

Technical Task

The present invention aims at providing a polymer polyol having excellent solvent resistance and low viscosity, and a process for producing the same.

Means for Solving Technical Task

According to an aspect, a process for producing a polymer polyol, comprising: (a) reacting a first mixture comprising an initiator, a polyol, a diluent, a stabilizer, a styrene-based monomer and a nitrile-based monomer; and (b) continuously adding, to the first mixture, a second mixture comprising an initiator, a polyol, a stabilizer, a styrene-based monomer and a nitrile-based monomer to react, wherein the first mixture and second mixture comprise the stabilizer in a weight ratio of 1:1 to 3, respectively, is provided.

In an embodiment, the total amount of the stabilizer may be in a range of 1 to 10 parts by weight based on total 100 parts by weight of the styrene-based monomer and nitrile-based monomer of the first mixture and second mixture.

In an embodiment, the weight ratio of the styrene-based monomer and nitrile-based monomer in the first mixture may be 75 to 85:15 to 25, and the weight ratio of the styrene-based monomer and nitrile-based monomer in the second mixture may be 65 to 75:25 to 35.

In an embodiment, the weight ratio of the total amount of the styrene-based monomer and the total amount of the nitrile-based monomer of the first mixture and second mixture may be 65 to 75:25 to 35.

In an embodiment, the first mixture and second mixture may comprise the polyol in a weight ratio of 1:1 to 5, respectively.

In an embodiment, the total amount of the polyol may be in a range of 60 to 120 parts by weight based on total 100 parts by weight of the styrene-based monomer and nitrile-based monomer of the first mixture and second mixture.

In an embodiment, the weight ratio of the first mixture and second mixture may be 10 to 35:65 to 90.

In an embodiment, the initiator may be at least one selected from the group consisting of 2,2'-azobis(2-methylpropionamidine)dihydrochloride, 2,2'-azobis[2-(N-phenylamidino)propane]dihydrochloride, 2,2'-azobis[2-(N-arylamidino)propane]dihydrochloride, 2,2'-azobis{2-[1-(2-hydroxyethyl)-2-imidazoline-2-yl]propane}dihydrochloride, 2,2'-azobis{2-methyl-N-[1,1-bis(hydroxymethyl)-2-hydroxyethyl]propionamide}, 2,2'-azobis[2-methyl-N-(2-hydroxyethyl)-propionamide], 4,4'-azobis(4-cyanovaleric acid), methyl ethyl ketone peroxide, methyl isobutyl ketone peroxide, di-t-butyl peroxide, t-butyl cumyl peroxide, t-butyl peroxy acetate, t-butyl peroxy isobutylate, t-butyl peroxy pibarate, t-amyl peroxy 2-ethyl hexanoate and hydrogen peroxide.

According to another aspect, a polymer polyol, wherein a copolymer comprising unit structures derived from a styrene-based monomer and a nitrile-based monomer is dispersed in a polyol continuous phase, the polymer polyol having a viscosity at 25° C. of 6,000 cps or less and having a filterability of 1 g or less as measured according to the following test method:

[Filterability Test Method]

After mixing 100 g of polymer polyol and 100 g of methylene chloride, the mixture was passed through a 40 mesh screen by gravity, and then the weight of a residue was determined as the filterability, is provided.

Effect of Invention

According to an aspect, a polymer polyol with excellent solvent resistance and low viscosity may be produced.

The effects of an aspect of the present invention are not limited to the above-mentioned effects, and it should be understood that the effects of the present invention include all effects that could be inferred from the configuration of the invention described in the detailed description of the invention or the appended claims.

BEST MODE FOR CARRYING OUT THE INVENTION

Hereinafter, an aspect of the present specification will be described with reference to specific embodiments. However, the description of the present specification may be implemented in various different forms, and thus is not limited to the embodiments described herein.

Throughout the specification, it will be understood that when a portion is referred to as being "connected" to another portion, it can be "directly connected to" the other portion, or "indirectly connected to" the other portion having intervening portions present. Also, when a component "includes" an element, unless there is another opposite description thereto, it should be understood that the component does not exclude another element but may further include another element.

When a range of numerical values is described herein, the value has the precision of the significant figures provided according to the standard rules in chemistry for significant figures, unless a specific range thereof is stated otherwise. For example, 10 includes a range of 5.0 to 14.9 and the number 10.0 includes a range of 9.50 to 10.49.

As used herein, the term "polymer polyol," also called a copolymer polyol, is a product in which a predetermined amount of a particulate organic or inorganic filler is dispersed in a base polyol in the liquid phase. A polyol produced by dispersing polymer particles in a polyether polyol and polymerizing the same is also a type of polymer polyol.

As used herein, the term "polyurethane" refers to a polymer material having a large amount of urethane (—NHCOO) bonds. Polyurethane is generally formed and processed into the form of foam, which is a honeycomb-shaped light material, through a polymer reaction generating bubbles. The term "polyurethane foam" is usually classified into flexible, rigid and semi-rigid types.

As used herein, the term "macromer," also called a macromonomer, refers to a macromolecule with a reactive end group, and may be introduced as a monomer in the polymer chain, thereby improving the polymerization stability. For example, polyols including ethylenically unsaturated functional groups may be used as a macromer.

As used herein, the term "primary particles" refers to particles produced by first polymerizing polyols and monomers. The primary particles have excellent steric stability and thus prevent aggregation of solid contents caused by particle collisions and unusual increase in viscosity.

As used herein, the term "secondary particles" refers to the following particles: i) particles produced by additionally polymerizing polyols and monomers with the primary particles; ii) particles produced by polymerizing polyols and monomers, separately from the primary particles, or iii) a mixture of particles produced by additionally polymerizing polyols and monomers with the primary particles and particles produced by polymerizing polyols and monomers, separately from the primary particles.

Process for Producing Polymer Polyol

A process for producing a polymer polyol according to an aspect may comprise: (a) reacting a first mixture comprising an initiator, a polyol, a diluent, a stabilizer, a styrene-based monomer and a nitrile-based monomer; and (b) continuously adding, to the first mixture, a second mixture comprising an initiator, a polyol, a stabilizer, a styrene-based monomer and a nitrile-based monomer to react, wherein the first mixture and second mixture comprise the stabilizer in a weight ratio of 1:1 to 3, respectively.

In step (a), the first mixture comprising an initiator, a diluent, a stabilizer, a polyol, a styrene-based monomer and a nitrile-based monomer may be reacted. A primary particle may be prepared by polymerizing the polyol, styrene-based monomer and nitrile-based monomer in the presence of the initiator, diluent and stabilizer.

In step (b), a secondary particle may be prepared by continuously adding, to the first mixture, a second mixture comprising an initiator, a polyol, a stabilizer, a styrene-based monomer and a nitrile-based monomer to react.

The first mixture and second mixture may comprise the stabilizer in a weight ratio of 1:1 to 3, respectively. For example, the weight ratio may be 1:1, 1:1.1, 1:1.2, 1:1.3, 1:1.4, 1:1.5, 1:1.6, 1:1.7, 1:1.8, 1:1.9, 1:2, 1:2.1, 1:2.2, 1:2.3, 1:2.4, 1:2.5, 1:2.6, 1:2.7, 1:2.8, 1:2.9, 1:3, or a range between any two of these values, but is not limited thereto. A stabilizer may be fed into the first mixture and second mixture dividedly to control the grafting ratio of each particle uniformly, thereby improving the dispersion stability. Accordingly, the aggregation of particles may be minimized to prevent an excessive increase in viscosity. Also, when mixing with compatible organic solvents, solvent resistance may be improved to reduce the generation of sludge.

The total amount of the stabilizer may be in a range of 1 to 10 parts by weight based on total 100 parts by weight of the styrene-based monomer and nitrile-based monomer of the first mixture and second mixture. For example, the total amount of the stabilizer may be 1 part by weight, 2 parts by weight, 3 parts by weight, 4 parts by weight, 5 parts by weight, 6 parts by weight, 7 parts by weight, 8 parts by weight, 9 parts by weight, 10 parts by weight, or a range between any two of these values, but is not limited thereto. When the total amount of the stabilizer deviates from the above range, the dispersion stability may decrease, or the viscosity may increase due to excessive reaction.

The weight ratio of the styrene-based monomer and nitrile-based monomer in the first mixture may be 75 to 85:15 to 25. For example, the weight ratio may be 75:15, 75:20, 75:25, 80:20, 80:25, 85:15, 85:20, 85:25, or a range between any two of these values, but is not limited thereto.

The weight ratio of the styrene-based monomer and nitrile-based monomer in the second mixture may be 65 to 75:25 to 35. For example, the weight ratio may be 65:25, 65:30, 65:35, 70:30, 70:35, 75:25, 75:30, 75:35, or a range between any two of these values, but is not limited thereto.

The weight ratio of the nitrile-based monomer may be lower in the first mixture than in the second mixture. A nitrile-based monomer may have relatively higher reactivity than a styrene-based monomer. Accordingly, in step (a) in which the initial reaction is performed, the ratio of the nitrile-based monomer is lowered to control the reaction with the stabilizer, and in step (b), the ratio of the nitrile-based monomer is raised to control the grafting ratio of the dispersion stabilizer to be more uniform. With the polymer polyol produced according to said process is used, a polyurethane foam having excellent quality may be prepared.

The weight ratio of the total amount of the styrene-based monomer and the total amount of the nitrile-based monomer of the first mixture and second mixture may be 65 to 75:25 to 35. For example, the weight ratio may be 65:25, 65:30, 65:35, 70:25, 70:30, 70:35, 75:25, 75:30, 75:35, or a range between any two of these values, but is not limited thereto. When the weight ratio deviates from the above range, the mechanical strength of the polyurethane foam may decrease, or the chemical resistance thereof may decrease.

The styrene-based monomer may be one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl) styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl) dimethylaminoethyl ether, vinylpyridine, vinylxylene, diphenylethylene, diphenylethylene comprising a tertiary amine, styrene comprising a primary, secondary or tertiary amine, derivatives thereof and combinations of two or more thereof, but is not limited thereto.

The nitrile-based monomer may be one selected from the group consisting of acrylonitrile, methacrylonitrile, ethacrylonitrile, methyl acrylate, ethyl acrylate, butyl acrylate, methyl methacrylate, ethyl methacrylate, butyl methacrylate, derivatives thereof and combinations of two or more thereof, but is not limited thereto.

For the diluent, a diluent that can dissolve a polymer polymerized from the monomers may be used. For example, the diluent may be one selected from the group consisting of n-octane, n-dodecane, cyclohexane, methyl cyclohexane, benzene, toluene, naphthalene, styrene, o-xylene, ethylbenzene, p-diethylbenzene, chloromethane, methylene chloride, 1,1-dichloroethylene, ethylene dichloride, chloroform, 1,1-dichloroethane, trichloroethylene, carbon tetrachloride, chlorobenzene, o-dichlorobenzene, tetrahydrofuran, 1,4-dioxane, dibenzyl ether, acetone, methyl ethyl ketone, cyclohexanone, diethyl ketone, acetophenone, methyl isobutyl ketone, methyl isoamyl ketone, isophorone, diisobutyl ketone, methyl acetate, ethyl formate, propylene-1,2-carbonate, ethyl acetate, diethyl carbonate, n-butyl acetate, 2-ethoxy ethyl acetate, isoamyl acetate, 2-nitropropane, nitrobenzene, pyridine, morpholine, aniline, N-methyl-2-pyrrolidone, cyclohexylamine, quinoline, N,N-dimethylformamide, carbon disulfide, dimethyl sulfoxide, ethanethiol, ethanol, aryl alcohol, 1-propanol, 2-propanol, 1-butanol, 2-butanol, benzyl alcohol, cyclohexanol, diacetone alcohol, ethylene glycol monoethyl ether, diethylene glycol monomethyl ether, diethylene glycol monoethyl ether, ethylene glycol monobutyl ether, diethylene glycol monobutyl ether, 1-decanol, benzoic acid, stearic acid, phenol, resorcinol, m-cresol, methyl salicylate, ethylene glycol, glycerol and propylene glycol, but is not limited thereto.

The first mixture and second mixture may comprise the polyol in a weight ratio of 1:1 to 5, respectively. For example, the weight ratio may be 1:1, 1:1.1, 1:1.2, 1:1.3, 1:1.4, 1:1.5, 1:1.6, 1:1.7, 1:1.8, 1:1.9, 1:2, 1:2.1, 1:2.2, 1:2.3, 1:2.4, 1:2.5, 1:2.6, 1:2.7, 1:2.8, 1:2.9, 1:3, 1:3.1, 1:3.2, 1:3.3, 1:3.4, 1:3.5, 1:3.6, 1:3.7, 1:3.8, 1:3.9, 1:4, 1:4.1, 1:4.2, 1:4.3, 1:4.4, 1:4.5, 1:4.6, 1:4.7, 1:4.8, 1:4.9, 1:5, or a range between any two of these values, but is not limited thereto. When the weight ratio of the polyol deviates from the above range, the particles may not be uniformly dispersed in the polymer polyol, leading to the degradation of quality, or the aggregation of polymers may occur.

The total amount of the polyol may be in a range of 60 to 120 parts by weight based on total 100 parts by weight of the styrene-based monomer and nitrile-based monomer of the first mixture and second mixture. For example, the amount may be 60 parts by weight, 61 parts by weight, 62 parts by weight, 63 parts by weight, 64 parts by weight, 65 parts by weight, 66 parts by weight, 67 parts by weight, 68 parts by weight, 69 parts by weight, 70 parts by weight, 71 parts by weight, 72 parts by weight, 73 parts by weight, 74 parts by weight, 75 parts by weight, 76 parts by weight, 77 parts by weight, 78 parts by weight, 79 parts by weight, 80 parts by weight, 81 parts by weight, 82 parts by weight, 83 parts by weight, 84 parts by weight, 85 parts by weight, 86 parts by weight, 87 parts by weight, 88 parts by weight, 89 parts by weight, 90 parts by weight, 91 parts by weight, 92 parts by weight, 93 parts by weight, 94 parts by weight, 95 parts by weight, 96 parts by weight, 97 parts by weight, 98 parts by weight, 99 parts by weight, 100 parts by weight, 101 parts by weight, 102 parts by weight, 103 parts by weight, 104 parts by weight, 105 parts by weight, 106 parts by weight, 107 parts by weight, 108 parts by weight, 109 parts by weight, 110 parts by weight, 111 parts by weight, 112 parts by weight, 113 parts by weight, 114 parts by weight, 115 parts by weight, 116 parts by weight, 117 parts by weight, 118 parts by weight, 119 parts by weight, 120 parts by weight, or a range between any two of these values, but is not limited thereto. When the amount of the polyol deviates from the above range, the solids content may be low, or the viscosity may be excessively raised.

The polyol may be a base polyol in the liquid phase. For example, the polyol may be polyether polyols which are prepared by the addition polymerization of alkylene oxides such as ethylene oxide, propylene oxide, butylene oxide, etc., with polyhydric alcohols such as ethylene glycol, glycerin, trimethylolpropane, pentaerythritol, sorbitol, sugar, etc., or amines such as triethanolamine, ethylenediamine, toluenediamine, etc., but is not limited thereto.

The viscosity at 25° C. of the polyol may be in a range of 100 to 1,000 cps, for example, 100 cps, 125 cps, 150 cps, 175 cps, 200 cps, 225 cps, 250 cps, 275 cps, 300 cps, 325 cps, 350 cps, 375 cps, 400 cps, 425 cps, 450 cps, 475 cps, 500 cps, 525 cps, 550 cps, 575 cps, 600 cps, 625 cps, 650 cps, 675 cps, 700 cps, 725 cps, 750 cps, 775 cps, 800 cps, 825 cps, 850 cps, 875 cps, 900 cps, 925 cps, 950 cps, 975 cps, 1,000 cps, or a range between any two of these values. When the viscosity of the polyol deviates from the above range, the polymer polyol has an excessively high viscosity, which makes it difficult to produce polyurethane.

The weight ratio of the first mixture and second mixture may be 10 to 35:65 to 90. For example, the weight ratio may be 10:65, 10:70, 10:75, 10:80, 10:85, 10:90, 15:65, 15:70, 15:75, 15:85, 15:90, 20:65, 20:70, 20:75, 20:80, 20:85, 20:90, 25:65, 25:70, 25:75, 25:80, 25:85, 25:90, 30:65, 30:70, 30:75, 30:80, 30:85, 30:90, 35:65, 35:70, 35:75, 35:80, 35:85, 35:90, or a range between any two of these values. When the weight ratio of the first mixture and second mixture deviates from the above range, it would be difficult to control the grafting ratio of the produced polymer polyol particles.

The initiator may be at least one selected from the group consisting of 2,2'-azobis(2-methylpropionamidine)dihydrochloride, 2,2'-azobis[2-(N-phenylamidino)propane]dihydrochloride, 2,2'-azobis[2-(N-arylamidino)propane]dihydrochloride, 2,2'-azobis{2-[1-(2-hydroxyethyl)-2-imidazoline-2-yl]propane}dihydrochloride, 2,2'-azobis {2-methyl-N-[1,1-bis(hydroxymethyl)-2-hydroxyethyl]propionamide}, 2,2'-azobis[2-methyl-N-(2-hydroxyethyl)-propionamide], 4,4'-azobis(4-cyanovaleric acid), methyl ethyl ketone peroxide, methyl isobutyl ketone peroxide, di-t-butyl peroxide, t-butyl cumyl peroxide, t-butyl peroxy acetate, t-butyl peroxy isobutylate, t-butyl peroxy pibarate, t-amyl peroxy 2-ethyl hexanoate and hydrogen peroxide.

In general, it is known that when producing a polymer polyol using a peroxide initiator, the reactivity can hardly be controlled, and thus a low viscosity can hardly be achieved.

However, a polymer polyol having low viscosity may be produced using a peroxide initiator according to the above producing process.

The polymerization temperature in steps (a) and (b) may be in a range of 80 to 150° C. For example, the polymerization temperature may be 80° C., 85° C., 90° C., 95° C., 100° C., 105° C., 110° C., 115° C., 120° C., 125° C., 130° C., 135° C., 140° C., 145° C., 150° C., or a range between any two of these values.

After the polymerization step, the process may further comprise a step of aging at a temperature the same as the polymerization temperature or higher for 1 to 10 hours. The polymer particles may be stably dispersed in the polyol through the aging step.

After the aging step, a degassing process may be performed to remove unreacted monomers and other additives, but is not limited thereto. The degassing process may be performed by any known methods.

Polymer Polyol

A polymer polyol according to another aspect, wherein a copolymer comprising unit structures derived from a styrene-based monomer and a nitrile-based monomer is dispersed in a polyol continuous phase, may have a viscosity at 25° C. of 6,000 cps or less and have a filterability of 1 g or less as measured according to the following test method:

[Filterability Test Method]

After mixing 100 g of polymer polyol and 100 g of methylene chloride, the mixture was passed through a 40 mesh screen by gravity, and then the weight of a residue was determined as the filterability.

The polymer polyol may be produced by the above producing process. Accordingly, the detailed features such as the types of polyol, styrene-based monomer and nitrile-based monomer and the weight ratios of the components, etc., and the effects achieved therefrom are the same as described above in the process for producing polymer polyol.

The polymer polyol may have a viscosity at 25° C. of 6,000 cps or less. For example, the viscosity may be 6,000 cps or less, 5,900 cps or less, 5,800 cps or less, 5,700 cps or less, 5,600 cps or less, 5,500 cps or less, 5,400 cps or less, 5,300 cps or less, 5,200 cps or less, 5,100 cps or less, cps or less, 4,900 cps or less, 4,800 cps or less, 4,700 cps or less, 4,600 cps or less, 4,500 cps or less, 4,400 cps or less, 4,300 cps or less, 4,200 cps or less, 4,100 cps or less, 4,000 cps or less, 3,900 cps or less, 3,800 cps or less, 3,700 cps or less, 3,600 cps or less, 3,500 cps or less, 3,400 cps or less, 3,300 cps or less, 3,200 cps or less, 3,100 cps or less, 3,000 cps or less, or a range between any two of these values or less, but is not limited thereto. When the viscosity deviates from the above range, aggregation may occur, or the quality of polyurethane may be degraded.

The filterability of the polymer polyol as measured according to the above test method may be 1 g or less. For example, the filterability may be 1 g or less, 0.9 g or less, 0.8 g or less, g, or less 0.6 g or less, 0.5 g or less, 0.4 g or less, 0.3 g or less, 0.2 g or less, 0.1 g or less, or a range between any two of these values or less, but is not limited thereto.

The filterability test is carried out by measuring the amount of sludge occurring when producing the polymer polyol. The polymer polyol may have a low viscosity while containing a small amount of sludge.

The solids content of the polymer polyol may be in a range of 35 to 62.5 wt %, for example, wt %, 37.5 wt %, 40 wt %, 42.5 wt %, 45 wt %, 47.5 wt %, 50 wt %, 52.5 wt %, 55 wt %, 57.5 wt %, 60 wt %, 62.5 wt %, or a range between any two of these values. The polymer polyol produced according to the above production process may have a low viscosity, while having a high solids content satisfying the above range.

Hereinafter, embodiments of the present specification will be described in more detail. However, the following experimental results describe only representative experimental results among the above examples, and the scope and content of the present specification may not be construed as narrowed or limited by the examples. Each effect of the various embodiments of the present specification not explicitly presented below will be specifically described in the corresponding section.

Raw Materials

The following compounds were used as raw materials to produce a polymer polyol.

Base polyol: polyether polyol having a viscosity of 550 cps prepared by reacting propylene oxide and ethylene oxide with glycerin in the presence of a double metal cyanide catalyst Polymerizable unsaturated monomers: styrene, acrylonitrile Polymerization stabilizer: polymerization stabilizer in the form of terminal reactive polymer (macromer)

Polymerization initiator A: azobisisobutyronitrile (2,2'-azobis(2-methylpropionitrile), AIBN)

Polymerization initiator B: t-amyl-peroxy-2-ethylhexanoate

Organic diluent: ethylbenzene (EB), isopropylalcohol (IPA)

Physical blowing agent: methylene chloride (MC)

Example 1

26.6 parts by weight of styrene and 11.4 parts by weight of acrylonitrile, as monomers, 0.18 parts by weight of a polymerization initiator azobisisobutyronitrile, 1.5 parts by weight of a polymerization stabilizer macromer, and 31.3 parts by weight of a base polyol having a viscosity at 25° C. of 550 cps were fed into a 5 L continuous addition tank equipped with a stirrer, and stirred for 5 minutes to prepare a continuous addition mixture.

After mixing 7.0 parts by weight of styrene and 3.0 parts by weight of acrylonitrile, as monomers, and 0.05 parts by weight of a polymerization initiator azobisisobutyronitrile in a 5 L reaction tank equipped with a stirrer and completely dissolving the mixture at room temperature, 1 part by weight of a polymerization stabilizer macromer and 18.2 parts by weight of a base polyol having a viscosity at 25° C. of 550 cps were fed thereinto and stirred for 10 minutes. 15 parts by weight of an organic diluent was additionally put into the reaction tank and completely dissolved, and then stirred at a rate of 250 rpm to raise the temperature of the reactant to 110° C. for 1 hour.

When the internal temperature of the reaction tank reached 110° C., the continuous addition mixture was continuously fed at the same rate over 5 hours. The temperature of the reaction tank and stirring conditions were maintained at 115 to 125° C. After completion of the feeding of the continuous addition mixture, the mixture was aged for 1 hour.

The polymerizate which had been polymerized and aged was transferred to a purification tank and vacuum degassed at the temperature of 120° C. for 20 hours to remove the unreacted monomers and organic diluent which were dissolved in the polymerizate, to obtain a polymer polyol.

Example 2

A polymer polyol was produced in the same manner as in Example 1 except that the weight ratio of styrene/acrylonitrile was adjusted to 80:20 when preparing a reactant.

Example 3

A polymer polyol was produced in the same manner as in Example 2 except that 0.15 parts by weight of a polymerization initiator azobisisobutyronitrile was added when preparing a continuous addition mixture.

Example 4

A polymer polyol was produced in the same manner as in Example 1 except that the weight ratio of styrene/acrylonitrile was adjusted to 50:50 when preparing a reactant.

Example 5

A polymer polyol was produced in the same manner as in Example 2 except that as a polymerization initiator, t-amyl peroxy 2-ethyl hexanoate was used.

Comparative Example 1

A polymer polyol was produced by raising the polymerization temperature in the state where a base polyol and an organic diluent were fed into a reaction tank, and feeding all the polymers at a constant rate.

Comparative Example 2

A polymer polyol was produced in the same manner as in Example 1 except that a polymerization stabilizer was fed at once when preparing a reactant.

Comparative Example 3

A polymer polyol was produced in the same manner as in Example 2 except that a polymerization stabilizer was fed dividedly such that 2.0 parts by weight of the polymerization stabilizer was fed when preparing a continuous addition mixture, and 0.5 parts by weight of the polymerization stabilizer was fed when preparing a reactant.

The compositions of the examples and comparative examples are shown in Table 1 and Table 2, respectively.

TABLE 1

| | | Example 1 | Example 2 | Example 3 | Example 4 | Example 5 |
|---|---|---|---|---|---|---|
| Primary particle preparation (reactant) | Base polyol | 18.2 | 18.2 | 18.2 | 18.2 | 18.2 |
| | Styrene | 7.0 | 8.0 | 8.0 | 5.0 | 8.0 |
| | Acrylonitrile | 3.0 | 2.0 | 2.0 | 5.0 | 2.0 |
| | Polymerization stabilizer | 1.0 | 1.0 | 1.0 | 1.0 | 1.0 |
| | Polymerization Initiator A | 0.05 | 0.05 | 0.05 | 0.05 | — |
| | Polymerization Initiator B | — | — | — | — | 0.05 |
| | Organic diluent | 15 | 15 | 15 | 15 | 15 |
| Secondary particle preparation (continuous addition mixture) | Base polyol | 31.3 | 31.3 | 31.3 | 31.3 | 31.3 |
| | Styrene | 26.6 | 25.6 | 25.6 | 28.6 | 25.6 |
| | Acrylonitrile | 11.4 | 12.4 | 12.4 | 9.4 | 12.4 |
| | Polymerization stabilizer | 1.5 | 1.5 | 1.5 | 1.5 | 1.5 |
| | Polymerization Initiator A | 0.18 | 0.18 | 0.15 | 0.18 | — |
| | Polymerization Initiator B | — | — | — | — | 0.18 |

TABLE 2

| | | Comparative example 1 | Comparative example 2 | Comparative example 3 |
|---|---|---|---|---|
| Primary particle preparation (reactant) | Base polyol | 10.0 | 18.2 | 18.2 |
| | Styrene | — | 7.0 | 7.0 |
| | Acrylonitrile | — | 3.0 | 3.0 |
| | Polymerization stabilizer | — | 2.5 | 0.5 |
| | Polymerization Initiator A | — | 0.05 | 0.05 |
| | Organic diluent | 15 | 15 | 15 |
| Secondary particle preparation (continuous addition mixture) | Base polyol | 39.5 | 31.3 | 31.3 |
| | Styrene | 33.6 | 26.6 | 26.6 |
| | Acrylonitrile | 14.4 | 11.4 | 11.4 |
| | Polymerization stabilizer | 2.5 | — | 2.0 |
| | Polymerization Initiator A | 0.18 | 0.18 | 0.15 |

Experimental Example

The physical properties of the polymer polyols prepared in the examples and comparative examples were evaluated, and the results are shown in Table 3. The physical properties were measured as below.

Filterability: After mixing 100 g of polymer polyol and 100 g of methylene chloride, the mixture was passed through a 40 mesh screen by gravity, and then the weight of a residue was determined as the filterability.

Foam hardness: As a method of measuring hardness, polyurethane foam prepared and formed by using the polymer polyol in a 300×300×100 mm mold was cured at room temperature for 1 day, and then compressed to 25% to measure a force applied.

TABLE 3

| | Solids content (wt %) | Viscosity (cps@25° C.) | Filterability (g) | Foam hardness (25% ILD, kgf/314 cm$^2$) |
|---|---|---|---|---|
| Example 1 | 48.3 | 5,800 | 0.44 | 55.87 |
| Example 2 | 48.1 | 5,000 | 0.35 | 54.36 |
| Example 3 | 48.0 | 4,900 | 0.37 | 58.67 |
| Example 4 | 48.5 | 5,600 | 0.51 | 53.74 |
| Example 5 | 48.3 | 5,800 | 0.37 | 56.89 |
| Comparative example 1 | 48.2 | 7,000 | 0.40 | 54.78 |
| Comparative example 2 | 48.5 | 5,400 | 1.3 | 57.64 |
| Comparative example 3 | 48.3 | 6,500 | 0.42 | 53.59 |

Referring to Table 3, it can be confirmed that Examples 1 to 5 all produced polymer polyols having a low viscosity of 6,000 cps or less. Particularly, it can be confirmed that Example 3 exhibited excellent filterability and the most excellent foam hardness, which means that by adjusting the weight ratio of styrene/acrylonitrile when preparing primary particles and secondary particles, the stability of the stabilizer and polymers was improved, and accordingly, the solvent resistance to the organic solvent and the physical properties of polyurethane were increased.

By comparison, it can be confirmed that comparative example 1, in which the stabilizer and styrene/acrylonitrile were not fed dividedly, but the polyol and diluent were mixed in advance and then all the polymers were fed, has an excessively high viscosity. Comparative example 2, in which the stabilizer was fed at once when preparing primary particles, had a filterability of 1.3 g, which means that styrene-acrylonitrile (SAN) particles had lowered dispersibility, causing excessive occurrence of sludge. Comparative example 3 had an increased viscosity compared to the examples although the stabilizer and styrene/acrylonitrile were fed dividedly, which means that adjusting the weight ratio of the dispersion stabilizer is also a significant factor.

The foregoing description of the present invention has been presented for illustrative purposes, and it is apparent to a person having ordinary skill in the art that the present invention can be easily modified into other detailed forms without changing the technical idea or essential features of the present invention. Therefore, it should be understood that the forgoing embodiments are by way of example only, and are not intended to limit the present disclosure. For example, each component which has been described as a unitary part can be implemented as distributed parts. Likewise, each component which has been described as distributed parts can also be implemented as a combined part.

The scope of the present invention is presented by the accompanying claims, and it should be understood that all changes or modifications derived from the definitions and scopes of the claims and their equivalents fall within the scope of the present invention.

What is claimed is:

1. A process for producing a polymer polyol, comprising:
   (a) reacting a first mixture comprising an initiator, a polyol, a diluent, a stabilizer, a styrene-based monomer and a nitrile-based monomer; and
   (b) continuously adding, to the first mixture, a second mixture comprising an initiator, a polyol, a stabilizer, a styrene-based monomer and a nitrile-based monomer to react,
   wherein the first mixture and second mixture comprise the stabilizer in a weight ratio of 1:1 to 3, respectively.

2. The process of claim 1, wherein the total amount of the stabilizer is in a range of 1 to 10 parts by weight based on total 100 parts by weight of the styrene-based monomer and nitrile-based monomer of the first mixture and second mixture.

3. The process of claim 1, wherein the weight ratio of the styrene-based monomer and nitrile-based monomer in the first mixture is 75 to 85:15 to 25, and the weight ratio of the styrene-based monomer and nitrile-based monomer in the second mixture is 65 to 75:25 to 35.

4. The process of claim 1, wherein the weight ratio of the total amount of the styrene-based monomer and the total amount of the nitrile-based monomer of the first mixture and second mixture is 65 to 75:25 to 35.

5. The process of claim 1, wherein the first mixture and second mixture comprise the polyol in a weight ratio of 1:1 to 5, respectively.

6. The process of claim 1, wherein the total amount of the polyol is in a range of 60 to 120 parts by weight based on total 100 parts by weight of the styrene-based monomer and nitrile-based monomer of the first mixture and second mixture.

7. The process of claim 1, wherein the weight ratio of the first mixture and second mixture is 10 to 35:65 to 90.

8. The process of claim 1, wherein the initiator is at least one selected from the group consisting of 2,2'-azobis(2-methylpropionamidine)dihydrochloride, 2,2'-azobis[2-(N-phenylamidino)propane]dihydrochloride, 2,2'-azobis[2-(N-arylamidino)propane]dihydrochloride, 2,2'-azobis {2-[1-(2-hydroxyethyl)-2-imidazoline-2-yl]propane}dihydrochloride, 2,2'-azobis {2-methyl-N-[1,1-bis(hydroxymethyl)-2-hydroxy ethyl]propionamide}, 2,2'-azobis[2-methyl-N-(2-hydroxyethyl)-propionamide], 4,4'-azobis(4-cyanovaleric acid), methyl ethyl ketone peroxide, methyl isobutyl ketone peroxide, di-t-butyl peroxide, t-butyl cumyl peroxide, t-butyl peroxy acetate, t-butyl peroxy isobutylate, t-butyl peroxy pibarate, t-amyl peroxy 2-ethyl hexanoate and hydrogen peroxide.

* * * * *